US009898029B2

(12) United States Patent
Rasmus

(10) Patent No.: US 9,898,029 B2

(45) Date of Patent: Feb. 20, 2018

(54) TEMPERATURE-COMPENSATED REFERENCE VOLTAGE GENERATOR THAT IMPRESSES CONTROLLED VOLTAGES ACROSS RESISTORS

(71) Applicant: QUALCOMM Incorporated, San Diego, CA (US)

(72) Inventor: Todd Morgan Rasmus, Cary, NC (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/970,265

(22) Filed: Dec. 15, 2015

(65) Prior Publication Data

US 2017/0168518 A1 Jun. 15, 2017

(51) Int. Cl.

| | |
|---|---|
| ***H02M 3/24*** | (2006.01) |
| ***G05F 3/26*** | (2006.01) |
| ***G05F 3/22*** | (2006.01) |
| ***G05F 3/24*** | (2006.01) |
| ***G05F 3/30*** | (2006.01) |

(52) U.S. Cl.

CPC .............. *G05F 3/262* (2013.01); *G05F 3/225* (2013.01); *G05F 3/24* (2013.01); *G05F 3/242* (2013.01); *G05F 3/245* (2013.01); *G05F 3/267* (2013.01); *G05F 3/30* (2013.01)

(58) Field of Classification Search

CPC .......... G05F 3/245; G05F 3/225; G05F 3/267; G05F 3/24; G05F 3/242

See application file for complete search history.

(56) References Cited

U.S. PATENT DOCUMENTS 6,891,358 B2 5/2005 Marinca 7,119,528 B1 * 10/2006 Rasmus .................... G05F 3/30 323/316

(Continued)

FOREIGN PATENT DOCUMENTS

CN 101923366 B 10/2012

OTHER PUBLICATIONS

Banba H., et al., "A CMOS bandgap reference circuit with sub-1-V operation", IEEE Journal of Solid-State Circuits, vol. 34, No. 5, pp. 670-674, May 1999.

(Continued)

*Primary Examiner* — Timothy J Dole

*Assistant Examiner* — Ishrat Jamali

(74) *Attorney, Agent, or Firm* — Loza & Loza, LLP/Qualcomm

(57) ABSTRACT

An apparatus and method for generating a temperature-compensated reference voltage are disclosed. The apparatus generates substantially equal temperature-compensated currents by controlling (through negative feedback) voltages across separate resistors through which the currents flow, respectively. Two of the temperature-compensated currents are formed by combining (e.g., summing) a complementary to absolute temperature (CTAT) current ($I_{CTAT}$) and a proportional to absolute temperature (PTAT) current ($I_{PTAT}$). A reference voltage $V_{REF}$ is produced by configuring the other the temperature-compensated current to flow through an output resistor.

30 Claims, 4 Drawing Sheets

(56) References Cited

U.S. PATENT DOCUMENTS

| | | | | |
|---|---|---|---|---|
| 7,612,606 | B2 | 11/2009 | Marinca | |
| 7,750,728 | B2 | 7/2010 | Marinca | |
| 8,941,369 | B2 | 1/2015 | Youssefi | |
| 2011/0291638 | A1* | 12/2011 | Chen ...................... | H03K 3/011<br>323/313 |
| 2012/0081099 | A1 | 4/2012 | Melanson et al. | |
| 2015/0205319 | A1* | 7/2015 | De Cremoux .......... | H02M 3/18<br>331/109 |

OTHER PUBLICATIONS

Lee S., et al., "Low-voltage bandgap reference with output-regulated current mirror in 90 nm CMOS", Electronics Letters, Jul. 8, 2010, vol. 46, Issue 14, pp. 976-977.

Marinca S., et al., "Curvature Correction Method for a Bandgap Voltage Reference", IET Irish Signals and Systems Conference (ISSC 2008), Jun. 18-19, 2008, pp. 134-137.

International Search Report and Written Opinion—PCT/US2016/063139—ISA/EPO—Mar. 16, 2017.

Quanzhen D., et al., "A 1.2-V 4.2-$\hbox{ppm}/ <{>\circ}\hbox{C}$ High-Order Curvature-Compensated CMOS Bandgap Reference", IEEE Transactions on Circuits and Systems I: Regular Papers, IEEE, US, vol. 62, No. 3, Mar. 1, 2015, XP011573880, pp. 662-670.

Waltari M., et al., "Reference Voltage Driver for Low-Voltage CMOS A/D Converters, Electronics, Circuits and Systems", 2000. ICECS 2000. The 7th IEEE Inte Rnational Conference on Dec. 17-20, 2000, Piscataway, NJ, USA,IEEE, vol. 1, Dec. 17, 2000 (Dec. 17, 2000), XP010535647, pp. 28-31.

* cited by examiner

TEMPERATURE-COMPENSATED REFERENCE VOLTAGE GENERATOR THAT IMPRESSES CONTROLLED VOLTAGES ACROSS RESISTORS

BACKGROUND

Field

Aspects of the present disclosure relate generally to generating temperature-compensated reference voltages, and more particularly, to a temperature-compensated reference voltage generator that generates temperature-compensated currents by impressing controlled voltages across resistors.

Background

A bandgap reference voltage source generates a reference voltage $V_{REF}$ that is substantially constant over a defined (very wide) temperature range. In discrete circuit or integrated circuit (IC) applications, the reference voltage $V_{REF}$ is used in many applications, such as for voltage regulation where a supply voltage is regulated based on the reference voltage.

The bandgap reference voltage generated is typically around 1.2 Volts because the source of the voltage is based on the 1.22 eV bandgap of silicon at zero (0) degree Kelvin. As the bandgap reference voltage $V_{REF}$ is about 1.2 Volts, a bandgap reference voltage source requires a supply voltage greater than the 1.2 Volts, such as a supply voltage of 1.4 Volts to accommodate, for example, a 200 millivolt (mV) drain-to-source voltage Vds of a field effect transistor (FET) used for biasing the bandgap reference voltage.

Currently, because of continued reduction in the size of FETs used in ICs and the further need to reduce power consumption, many circuits operate with supply voltages below the bandgap voltage of 1.2 Volts. In response to such need, bandgap reference voltage sources have been designed to operate with supply voltage below 1.2 Volts.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

An aspect of the disclosure relates to an apparatus configured to generate a temperature-compensated reference voltage. The apparatus includes first and second set of resistors; a current generator configured to generate a first temperature-compensated current through the first set of one or more resistors, wherein a first voltage is generated across the first set of one or more resistors based on the first temperature-compensated current; a control circuit configured to generate a second voltage across the second set of one or more resistors, wherein the second voltage is based on the first voltage, and wherein a second temperature-compensated current is generated through the second set of resistors based on the second voltage; and a third set of one or more resistors through which the second temperature-compensated current flows, wherein the temperature-compensated reference voltage is generated across the third set of one or more resistors based on the second temperature-compensated current.

Another aspect of the disclosure relates to a method for generating a temperature-compensated reference voltage. The method includes generating a first temperature-compensated current through a first set of one or more resistors, wherein a first voltage is generated across the first set of one or more resistors based on the first temperature-compensated current; generating a second voltage across a second set of one or more resistors, wherein the second voltage is based on the first voltage, and wherein a second temperature-compensated current is generated through the second set of resistors based on the second voltage; and applying the second temperature-compensated current through a third set of one or more resistors, wherein the temperature-compensated reference voltage is generated across the third set of one or more resistors.

Another aspect of the disclosure relates to an apparatus configured to generate a temperature-compensated reference voltage. The apparatus comprises means for generating a first temperature-compensated current through a first set of one or more resistors, wherein a first voltage is generated across the first set of one or more resistors based on the first temperature-compensated current; means for generating a second voltage across a second set of one or more resistors, wherein the second voltage is based on the first voltage, and wherein a second temperature-compensated current is generated through the second set of resistors based on the second voltage; and means for applying the second temperature-compensated current through a third set of one or more resistors, wherein the temperature-compensated reference voltage is generated across the third set of one or more resistors.

To the accomplishment of the foregoing and related ends, the one or more embodiments include the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the description embodiments are intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
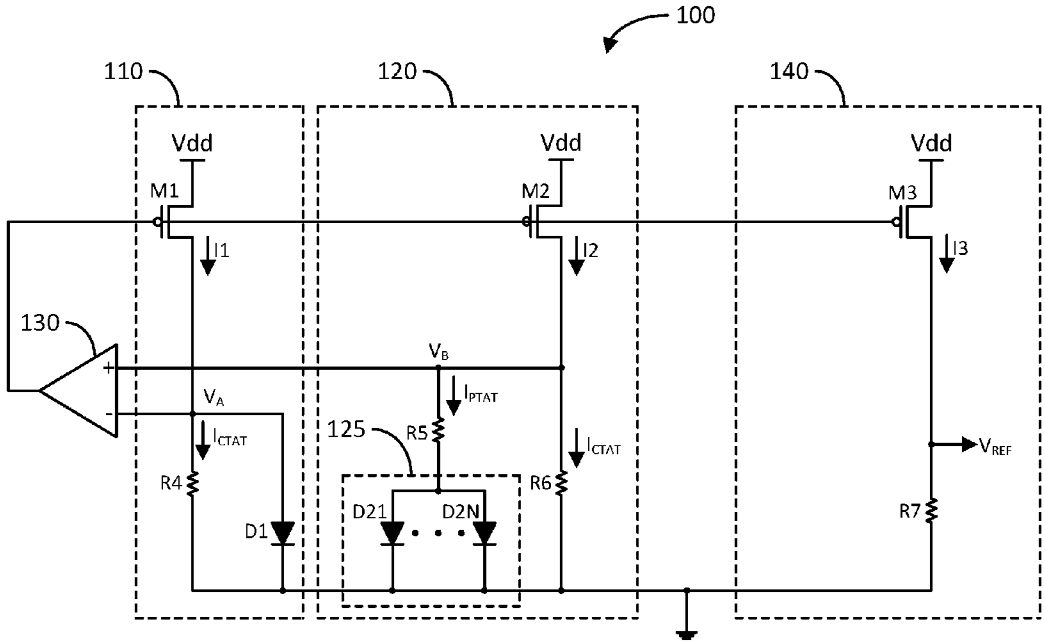
FIG. 1 illustrates a schematic diagram of an exemplary apparatus for generating a temperature-compensated reference voltage in accordance with an aspect of the disclosure.

FIG. 1 illustrates a schematic diagram of an exemplary apparatus 100 for generating a temperature-compensated reference voltage $V_{REF}$ in accordance with an aspect of the disclosure.

The apparatus 100 includes a sub-circuit 110 for generating a complementary to absolute temperature (CTAT) current $I_{CTAT}$ (e.g., a negative temperature coefficient current). The sub-circuit 110 includes field effect transistor (FET) M1, resistor R4, and diode D1. The FET M1, which may be implemented with a p-channel metal oxide semiconductor (PMOS) FET, is coupled in series with the parallel-coupling of resistor R4 and diode D1 between a first voltage rail (e.g., Vdd) and a second voltage rail (e.g., ground). The FET M1, serving as a current source, is configured to generate a current I1, which is split between the resistor R4 and diode D1. The voltage $V_A$ formed across the diode D1 has a negative temperature coefficient, e.g., a CTAT voltage. The voltage $V_A$ is also across the resistor R4. Thus, an $I_{CTAT}$ current is formed through resistor R4.

The apparatus 100 includes a sub-circuit 120 for generating a proportional to absolute temperature (PTAT) current. The sub-circuit 120 includes resistors R5 and R6, a diode bank 125 of N parallel diodes D21 to D2N, an operational amplifier (Op Amp) 130, and FET M2. The FET M2, resistor R5, and diode bank 125 are coupled in series between Vdd and ground. The FET M2, which may be implemented with a PMOS FET, is also coupled in series with resistor R6 between Vdd and ground. The Op Amp 130 includes a negative input terminal configured to receive the voltage $V_A$ across the diode D1, a positive input terminal configured to receive a voltage $V_B$ across the series connection of the resistor R5 and diode bank 125, and an output terminal coupled to the gates of FETs M1 and M2.

Through negative feedback control, the Op Amp 130 controls the currents I1 and I2 through the FETs M1 and M2 via their respective gate voltages, such that voltage $V_B$ is based on voltage $V_A$ (e.g., substantially equal to each other, $V_B=V_A$). Since the FETs M1 and M2 are configured to have the same size and also have their gates coupled together to form a current mirror, the currents I1 and I2 are also substantially the same. Since voltages $V_A$ and $V_B$ are the same, and resistors R4 and R6 are configured to have substantially the same resistance, the current through resistor R6 is also a $I_{CTAT}$ current, e.g., substantially the same as the current $I_{CTAT}$ through resistor R4.

Accordingly, the current through diode D1 is substantially the same as the combined current through the N parallel diodes D21 to D2N of the diode bank 125. The diodes D21 and D2N of the diode bank 125 are each configured to be substantially the same as the diode D1. Thus, because the same current through diode D1 is split among N diodes of the diode bank 125, the current density through each of the diodes of the diode bank 125 is a factor of N less than the current density through diode D1. Because of the difference in current density, the diode bank 125 produces a CTAT voltage that is different than the CTAT voltage across diode D1. As a result, a voltage is produced across the resistor R5 that has a positive temperature coefficient (e.g., a PTAT voltage). This produces a current $I_{PTAT}$ through resistor R5.

The current I2 produced by FET M2 is a combination (e.g., sum) of the currents $I_{PTAT}$ and $I_{CTAT}$. Thus, by proper selection of the resistances of R4, R5, and R6, the current I2 may be configured to be substantially constant over a defined range of temperatures.

The apparatus 100 further includes a sub-circuit 140 configured to generate the temperature-compensated reference voltage $V_{REF}$ based on the temperature-compensated current I2 through M2. The sub-circuit 140 includes FET M3 and resistor R1. The temperature-compensated current I2 is mirrored via the current mirror configuration of FETs M2 and M3 (e.g., the FETs are configured to have substantially the same size and the same gate-to-source voltage Vgs) to form a temperature-compensated current I3. The FET M3, which may also be implemented with a PMOS FET, is coupled in series with a resistor R7 between Vdd and ground, which results in the temperature-compensated current I3 flowing through resistor R7 to form the temperature-compensated reference voltage $V_{REF}$.

Thus, in order for the apparatus 100 to properly operate, the currents I1, I2, and I2 generated by the current sources M1, M2, and M3 should be substantially the same. However, due to the supply voltage Vdd being relatively low (e.g., sub 1V), the drain-to-source voltage Vds of FETs M1 and M2 may become relatively small due to the voltages $V_A$ and $V_B$ increasing with temperature reduction. In such case, the Vds of FETs M1 and M2 may be significantly smaller than the Vds of FET M3; and hence, the FETs M1 and M2 may have output impedances different than the output impedance of FET M3. This produces a current mismatch between current I3 and currents I1 and I2, which produces error in the reference voltage $V_{REF}$.

Additional mismatch among the currents I1, I2, and I3 may be caused by mismatch in the FETs M1, M2, and M3 due to process variation.

Figure 2:
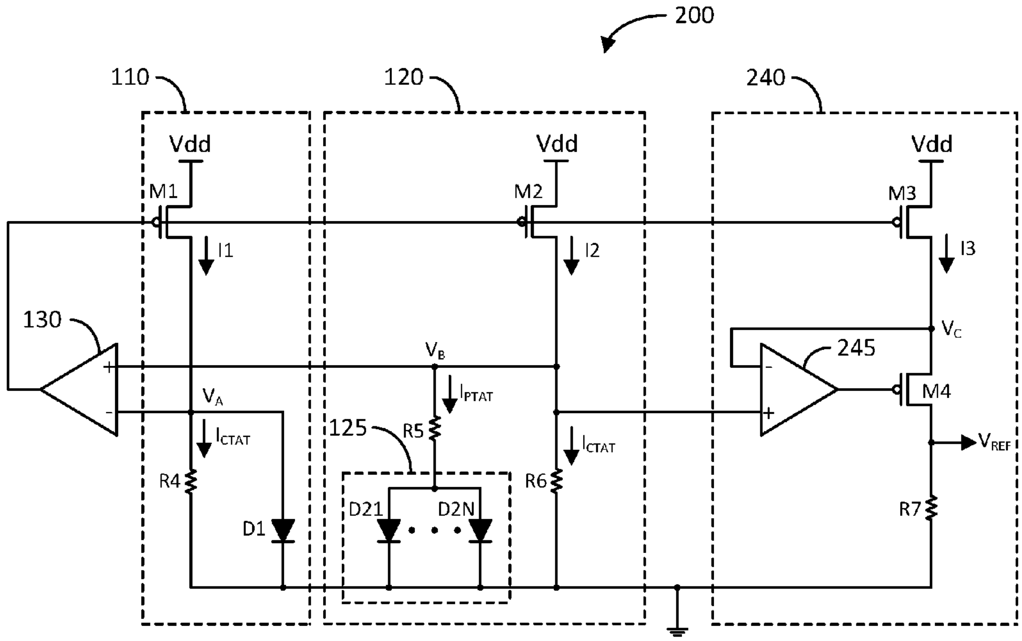
FIG. 2 illustrates a schematic diagram of another exemplary apparatus for generating a temperature-compensated reference voltage in accordance with another aspect of the disclosure.

FIG. 2 illustrates a schematic diagram of another exemplary apparatus 200 for generating a temperature-compensated reference voltage $V_{REF}$ in accordance with another aspect of the disclosure. The apparatus 200 is configured to address the problem associated with the FETs M1, M2, and M3 having different drain-to-source voltages Vds; and hence, different output impedances which produce current mismatch among currents I1, I2, and I3. The apparatus 200 is similar to that of apparatus 100, but includes a modified reference voltage $V_{REF}$ generating sub-circuit 240 having an additional control circuit to ensure that the voltages across the current source FETs M1, M2, and M3 are substantially the same.

In particular, in addition to the FET M3 and resistor R7, the sub-circuit 240 includes an Op Amp 245 and a FET M4. The Op Amp 245 includes a positive input configured to receive the voltage $V_B$, a negative input coupled to the drain of FET M3, and an output coupled to a gate of FET M4. The FET M4, which may be implemented with a PMOS FET, is coupled between FET M3 and resistor R7. The reference voltage $V_{REF}$ is generated at the drain of FET M4.

Due to negative feedback, the Op Amp 245 controls the gate of FET M4 such that voltage $V_C$ is substantially the same as voltage $V_B$. Thus, the voltages across the current source FETs M1, M2, and M3 are substantially the same.

Although this is an improvement over the apparatus 100 shown in FIG. 1, there is still error in the reference voltage $V_{REF}$ due to mismatch between the current source FETs M1, M2, and M3. That is, even though the voltages across the FETs M1, M2, and M3 may be made substantially the same through the negative feedback control provided by Op Amps 130 and 245 and FET M4, the currents I1, I2, and I2 respectively through the FETs M1, M2, and M3 may be different due to difference in their transconductance gains caused by process variations. This results in different currents I1, I2, and I3, which produces error in the reference voltage $V_{REF}$. This error becomes more prevalent as the supply voltage Vdd is reduced.

Figure 3:
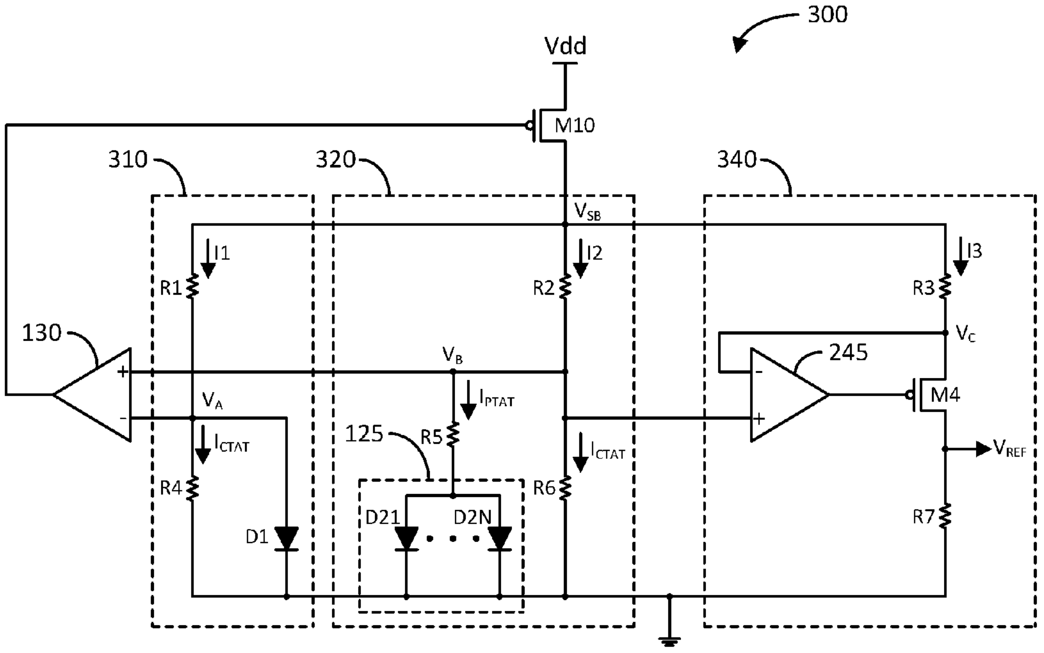
FIG. 3 illustrates a schematic diagram of yet another exemplary apparatus for generating a temperature-compensated reference voltage in accordance with another aspect of the disclosure.

FIG. 3 illustrates a schematic diagram of yet another exemplary apparatus 300 for generating a temperature-compensated reference voltage $V_{REF}$ in accordance with another aspect of the disclosure. The concept behind the apparatus 300 stems from the fact that resistors may be made more consistent than FETs; and thus, better matching between the resistors may be achieved as compared to FETs. Accordingly, the concept behind apparatus 300 is to replace the current sources M1, M2, and M3 with respective resistors R1, R2, and R3 (having substantially equal resistance) and apply negative feedback control using Op Amps 130 and 245 to impress substantially the same voltages across the resistors R1, R2, and R3. This ensures that the currents I1, I2, and I3 generated respectively through the resistors R1, R2, and R3 are substantially the same, which leads to significant reduction in error in the reference voltage $V_{REF}$.

In particular, the apparatus 300 includes a sub-circuit 310 configured to generate a $I_{CTAT}$ current, a sub-circuit 320 configured to generate a $I_{PTAT}$ current, and a sub-circuit 340 configured to generate a temperature-compensated reference voltage $V_{REF}$. The sub-circuits 310, 320, and 340 are respectively similar to sub-circuits 110, 120, and 240 of apparatus 200, but differ in that resistors R1, R2, and R3 are substituted for the current source FETs M1, M2, and M3, respectively. In addition, the apparatus 300 further includes a FET M10, which may be implemented with a PMOS FET, coupled between the supply voltage rail Vdd and the resistors R1, R2, and R3. The output of the Op Amp 130 is coupled to the gate of FET M10 to control a voltage $V_{SB}$ at a node common to resistors R1, R2, and R2. This is called single-point biasing, where the negative feedback operates on a bias voltage (e.g., $V_{SB}$) at a single node.

Accordingly, the negative feedback control provided by Op Amp 130 forces the voltage $V_A$ and $V_B$ to be substantially the same. Thus, the voltage drops across the resistors R1 and R2 are equal to each other ($V_{SB}-V_A=V_{SB}-V_B$ because $V_A=V_B$). Similarly, the negative feedback control produced by Op Amp 245 forces the voltages $V_B$ and $V_C$ to be substantially the same. Thus, the voltage drops across the resistors R2 and R3 are equal to each other ($V_{SB}-V_B=V_{SB}-V_C$ because $V_B=V_C$).

Since the voltages across the resistors R1, R2, and R3 are substantially the same, and the resistors R1, R2, and R3 may be fabricated to have substantially the same resistance, the temperature-compensated currents I1, I2, and I3 are substantially the same. This results in a significant reduction in the error in generating the reference voltage $V_{REF}$.

Figure 4:
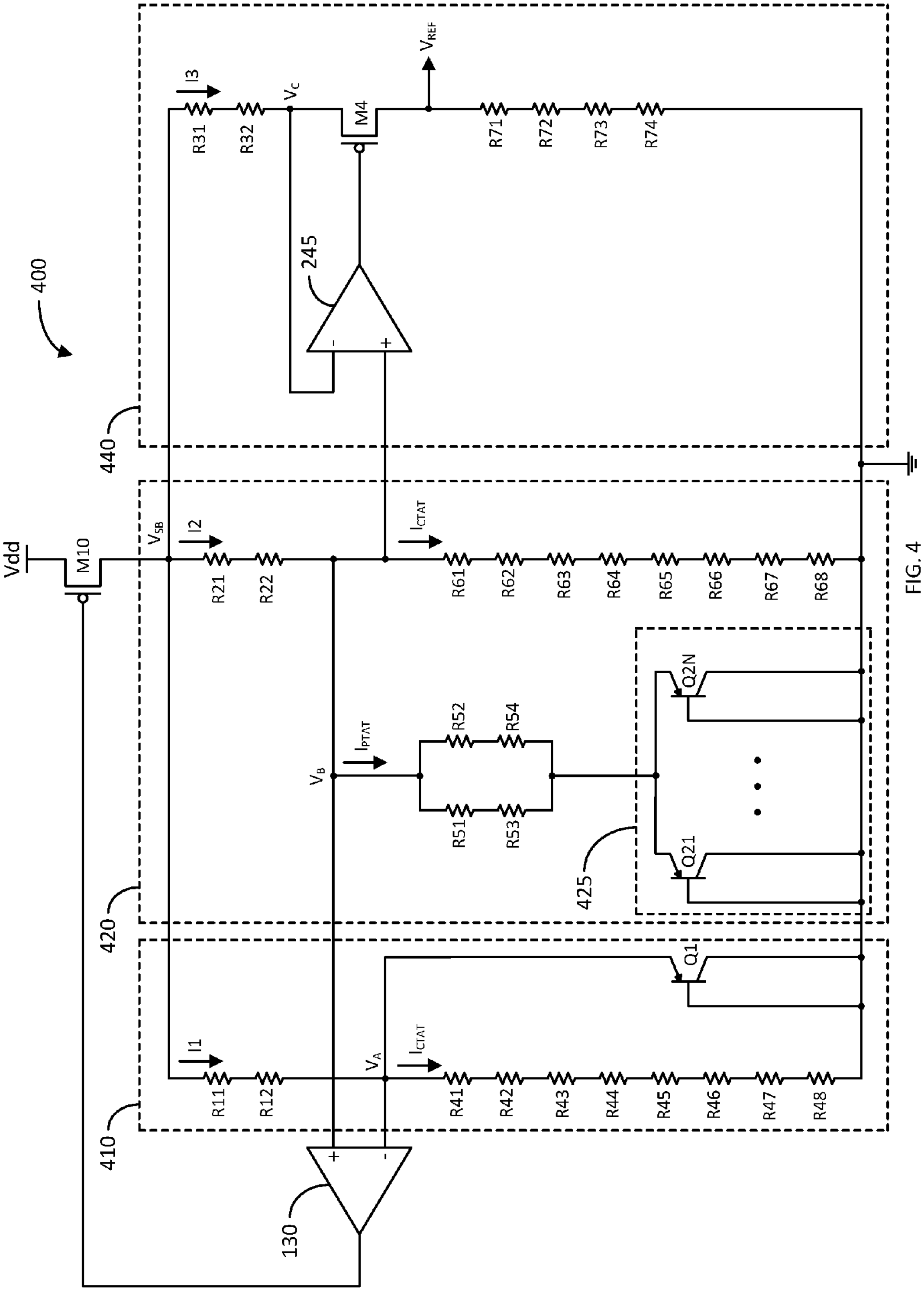
FIG. 4 illustrates a schematic diagram of still another exemplary apparatus for generating a temperature-compensated reference voltage in accordance with another aspect of the disclosure.

FIG. 4 illustrates a schematic diagram of still another exemplary apparatus 400 for generating a temperature-compensated reference voltage $V_{REF}$ in accordance with another aspect of the disclosure. The apparatus 400 may be an example of a more detailed implementation of reference voltage source 300. The apparatus 400 includes a sub-circuit 410 configured to generate a $I_{CTAT}$ current, a sub-circuit 420 configured to generate a $I_{PTAT}$ current, and a sub-circuit 440 configured to generate a temperature-compensated reference voltage $V_{REF}$. With some differences as noted below, the sub-circuits 410, 420, and 440 are similar to sub-circuits 310, 320, and 340 of apparatus 300, respectively. The remaining circuitry of apparatus 400, namely Op Amps 130 and 245 and FET M10, are substantially the same as that of apparatus 300.

The differences between the apparatuses 400 and 300 are as follows: (1) resistor R1 is replaced by series-coupled resistors R11 and R12; (2) resistor R2 is replaced by series-coupled resistors R21 and R22; (3) resistor R3 is replaced by series-coupled resistors R31 and R32; (4) resistor R4 is replaced by series-coupled resistors R41-R48; (5) resistor R5 is replaced by a pair of series-coupled resistors R51-R52 and R53-R54 coupled in parallel with each other; (6) resistor R6 is replaced by series-coupled resistors R61-R68; (7) resistor R7 is replaced by series-coupled resistors R71-R74; (8) diode D1 is replaced with diode-connected bipolar transistor Q1; and (9) the diode bank 125 of parallel diodes D21-D2N is replaced by a diode bank 425 of parallel diode-connected bipolar transistors Q21-Q2N.

The principle of operation of apparatus 400 is essentially the same as that of apparatus 300. The reasons for multiple resistors in apparatus 400 in place of single resistors in apparatus 300 are two folds: (1) Due to process requirements (e.g., limitations on the length-to-width ratio of a resistor), multiple resistors (each compliant with the process requirement) may need to be connected in series or in parallel to achieve the desired resistance; and (2) multiple resistors allow for process variations to be statistically averaged out for better control of the total resistance of each set of resistors. Note that the number and/or combination of resistors that replace each single resistor may vary in other implementations. It should be apparent to one of skill in the art that the concept disclosed herein is not limited to the particular implementation illustrated in FIG. 4.

Figure 5:
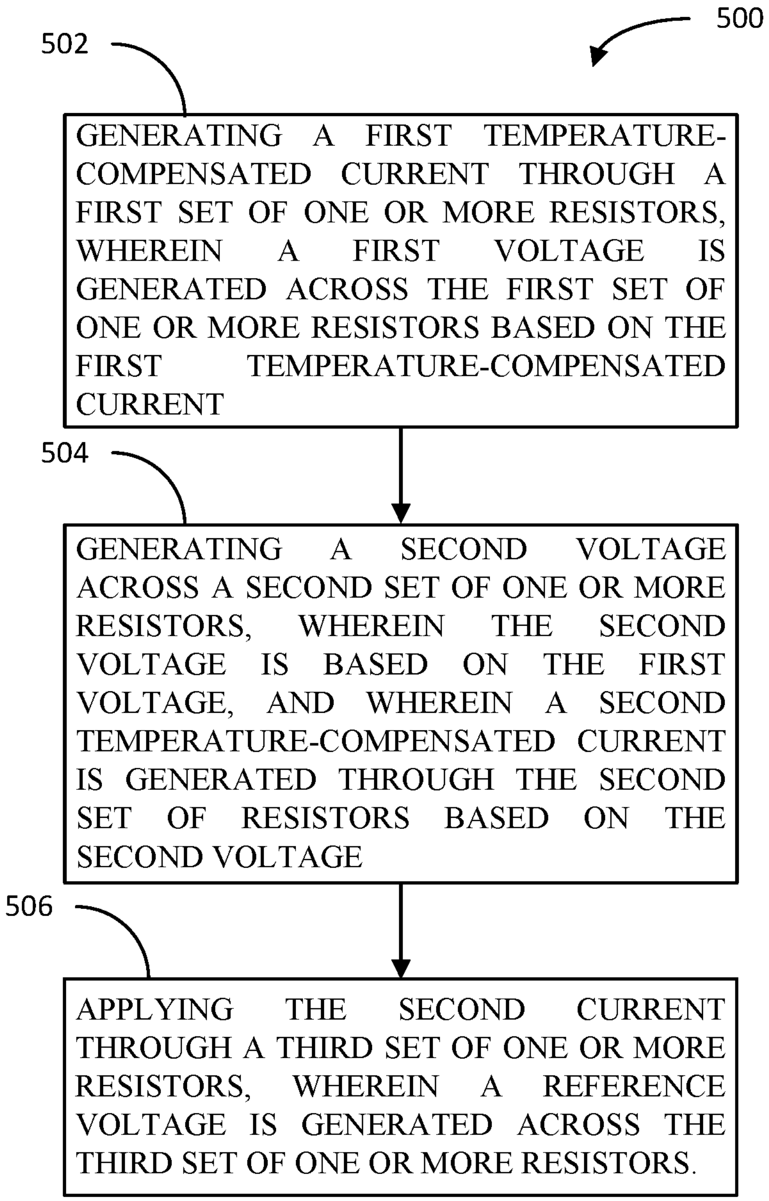
FIG. 5 illustrates a flow diagram of an exemplary method of generating a temperature-compensated reference voltage in accordance with another aspect of the disclosure.

FIG. 5 illustrates a flow diagram of an exemplary method 500 for generating a temperature-compensated reference voltage $V_{REF}$ in accordance with another aspect of the disclosure. The method 500 includes generating a first temperature-compensated current through a first set of one or more resistors, wherein a first voltage is generated across the first set of one or more resistors based on the first temperature-compensated current (block 502).

With reference to FIGS. 3-4, examples of means for generating a first temperature-compensated current I2 include the circuitry having: (1) resistor(s) R1 (or R11-R12), R2 (or R21-R22), R4 (or R41-R48), R5 (or R51-R54), and R6 (or R61-R68); (2) diode D1 or diode-connected transistor Q1; (3) diode bank 125 of diodes D21-D2N coupled in parallel or diode bank 425 of diode-connected transistors Q21-Q2N; and (4) control circuit including Op Amp 130 and transistor (e.g., FET) M10. The first temperature-compensated current I2 flows through a first set of one or more resistor(s) R2 or R21-R22, wherein a first voltage ($V_{SB}-V_B$) is generated across the first set of one or more resistor(s) R2 or R21-R22 based on the first temperature-compensated current I2.

The method 500 includes generating a second voltage across a second set of one or more resistors, wherein the second voltage is based on the first voltage, and wherein a second temperature-compensated current is generated through the second set of resistors based on the second voltage (block 504).

With reference to FIGS. 3-4, examples of means for generating a second voltage include Op Amp 245 and transistor (e.g., FET) M4. Thus, the second voltage ($V_{SB}-V_C$) is generated across the second set of one or more resistor(s) R3 or R31-R32, wherein the second voltage ($V_{SB}-V_C$) is based (e.g., substantially equal to) the first voltage ($V_{SB}-V_B$), and wherein the second temperature-compensated current I3 is generated through the second set of resistor(s) R3 or R31-R32 based on the second voltage ($V_{SB}$–$V_C$).

The method 500 includes applying the second current through a third set of one or more resistors, wherein a temperature-compensated reference voltage is generated across the third set of one or more resistors (block 506).

With reference to FIGS. 3-4, examples of means for applying the second current through a third set of one or more resistors include the series-connection of the resistor R3 or R31-R32, FET M4, and resistor(s) R7 or R71-R74. Thus, the second current I3 is applied through the third set of one or more resistor(s) R7 or R71-R74 to generate a temperature-compensated reference voltage $V_{REF}$ across the third set of one or more resistor(s) R7 or R71-R74.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. An apparatus, comprising:
 a first set of one or more resistors;
 a second set of one or more resistors;
 a first transistor coupled between a first voltage rail and the first and second sets of one or more resistors, respectively;
 a current generator configured to:
  generate a control signal at a control terminal of the first transistor to produce a single-bias voltage applied to respective first ends of the first and second sets of one or more resistors; and
  generate a first voltage at a second end of the first set of one or more resistors, wherein a first temperature-compensated current is generated through the first set of one or more resistors based on a first voltage difference between the single-bias voltage and the first voltage;
 a first control circuit configured to generate a second voltage at a second end of the second set of one or more resistors, wherein the second voltage is based on the first voltage, and wherein a second temperature-compensated current is generated through the second set of one or more resistors based on a second voltage difference between the single-bias voltage and the second voltage; and
 a third set of one or more resistors through which the second temperature-compensated current flows, wherein a temperature-compensated reference voltage is generated across the third set of one or more resistors based on the second temperature-compensated current.

2. The apparatus of claim 1, wherein the current generator comprises:
 a complementary to absolute temperature (CTAT) current generator configured to generate a CTAT current; and
 a proportional to absolute temperature (PTAT) current generator configured to generate a PTAT current, wherein the first temperature-compensated current comprises a combination of the CTAT current and the PTAT current.

3. The apparatus of claim 2, wherein the CTAT current generator comprises:
 a first device configured to generate a first CTAT voltage; and
 a fourth set of one or more resistors, wherein the first CTAT voltage is applied across the fourth set of one or more resistors to generate the CTAT current.

4. The apparatus of claim 3, wherein the first device comprises a diode or a diode-connected transistor.

5. The apparatus of claim 3, wherein the PTAT current generator comprises:
 a second device configured to generate a second CTAT voltage; and
 a fifth set of one or more resistors configured to receive across thereof a PTAT voltage based on a difference between the first voltage and the second CTAT voltage, wherein the first voltage is based on the first CTAT voltage.

6. The apparatus of claim 5, wherein the second device comprises a plurality of diodes coupled in parallel or a plurality of diode-connected transistors coupled in parallel.

7. The apparatus of claim 5, wherein the current generator further comprises a second control circuit configured to generate the first voltage based on the first CTAT voltage.

8. The apparatus of claim 7, wherein the second control circuit comprises:
 a first operational amplifier comprising:
  a first input configured to receive the first CTAT voltage;
  a second input configured to receive the first voltage;
  an output configured to generate the control signal based on the first CTAT voltage and the first voltage;
 and
 a sixth set of one or more resistors coupled between the first transistor and the first input of the first operational amplifier, wherein a third temperature-compensated current is generated through the sixth set of one or more resistors based on a third voltage difference between the single-bias voltage and the first CTAT voltage;
 wherein the first set of one or more resistors is coupled between the first transistor and the second input of the first operational amplifier;
 wherein a seventh set of one or more resistors is coupled between the second input of the first operational amplifier and a second voltage rail.

9. The apparatus of claim 8, wherein the first control circuit comprises:
 a second transistor coupled between the second set of one or more resistors and the third set of one or more resistors; and
 a second operational amplifier including a first input coupled to the second input of the first operational amplifier, a second input coupled to a second node between the second set of one or more resistors and the second transistor, and an output coupled to a control terminal of the second transistor.

10. The apparatus of claim 1, wherein the first control circuit comprises:
 a second transistor coupled between the second set of one or more resistors and the third set of one or more resistors; and
 an operational amplifier including a first input coupled to the second end of the first set of one or more resistors, a second input coupled to a node between the second set of one or more resistors and the second transistor, and an output coupled to a control terminal of the second transistor.

11. A method, comprising:

generating a control signal at a control terminal of a first transistor to produce a single-bias voltage at respective first ends of first and second sets of one or more resistors, wherein a first temperature-compensated current is generated through the first set of one or more resistors based on a first voltage difference between the single-bias voltage and a first voltage at a second end of the first set of one or more resistors;

generating a second voltage at a second end of the second set of one or more resistors, wherein the second voltage is based on the first voltage, and wherein a second temperature-compensated current is generated through the second set of one or more resistors based on a second voltage difference between the single-bias voltage and the second voltage; and applying the second temperature-compensated current through a third set of one or more resistors, wherein a temperature-compensated reference voltage is generated across the third set of one or more resistors based on the second temperature-compensated current.

12. The method of claim 11, wherein generating the first temperature-compensated current comprises:

generating a complementary to absolute temperature (CTAT) current;

generating a proportional to absolute temperature (PTAT) current; and combining the CTAT current with the PTAT current to generate the first temperature-compensated current.

13. The method of claim 12, wherein generating the CTAT current comprises:

generating a first CTAT voltage; and applying the first CTAT voltage across a fourth set of one or more resistors to generate the CTAT current.

14. The method of claim 13, wherein the generating the first CTAT voltage comprises biasing a diode or a diode-connected transistor.

15. The method of claim 13, wherein generating the PTAT current comprises:

generating a second CTAT voltage;

generating the first voltage based on the first CTAT voltage; and applying a fourth voltage across a fifth set of one or more resistors to generate the PTAT current, wherein the fourth voltage is based on a difference between the first voltage and the second CTAT voltage.

16. The method of claim 15, wherein generating the second CTAT voltage comprises biasing a plurality of diodes coupled in parallel or a plurality of diode-connected transistors coupled in parallel.

17. The method of claim 15, further comprising generating the control signal to configure the first voltage to be based on the first CTAT voltage.

18. The method of claim 17, further comprising:

applying a fifth voltage across a sixth set of one or more resistors, wherein the fifth voltage is based on a difference between the single-bias voltage and the first CTAT voltage; and applying a sixth voltage across a seventh set of one or more resistors, wherein the sixth voltage is based on a difference between the first voltage and a supply rail voltage.

19. The method of claim 18, further comprising generating the second voltage substantially the same as the first voltage.

20. The method of claim 11, further comprising generating the second voltage substantially the same as the first voltage.

21. An apparatus, comprising:

means for generating a control signal at a control terminal of a first transistor to produce a single-bias voltage at respective first ends of first and second sets of one or more resistors, wherein a first temperature-compensated current is generated through a first set of one or more resistors based on a first voltage difference between the single-bias voltage and a first voltage at a second end of the first set of one or more resistors;

means for generating a second voltage at a second end of the second set of one or more resistors, wherein the second voltage is based on the first voltage, and wherein a second temperature-compensated current is generated through the second set of one or more resistors based on a second voltage difference between the single-bias voltage and the second voltage; and means for applying the second temperature-compensated current through a third set of one or more resistors, wherein a temperature-compensated reference voltage is generated across the third set of one or more resistors based on the second temperature-compensated current.

22. The apparatus of claim 21, wherein generating the first temperature-compensated current comprises:

means for generating a complementary to absolute temperature (CTAT) current;

means for generating a proportional to absolute temperature (PTAT) current; and means for combining the CTAT current with the PTAT current to generate the first temperature-compensated current.

23. The apparatus of claim 22, wherein the means for generating the CTAT current comprises:

means for generating a first CTAT voltage; and means for applying the first CTAT voltage across a fourth set of one or more resistors to generate the CTAT current.

24. The apparatus of claim 23, wherein the means for generating the first CTAT voltage comprises means for biasing a diode or a diode-connected transistor.

25. The apparatus of claim 23, wherein the means for generating the PTAT current comprises:

means for generating a second CTAT voltage;

means for generating the first voltage based on the first CTAT voltage; and means for applying a fourth voltage across a fifth set of one or more resistors to generate the PTAT current, wherein the fourth voltage is based on a difference between the first voltage and the second CTAT voltage.

26. The apparatus of claim 25, wherein the means for generating the second CTAT voltage comprises means for biasing a plurality of diodes coupled in parallel or a plurality of diode-connected transistors coupled in parallel.

27. The apparatus of claim 25, further comprising means for generating the control signal to configure the first voltage to be based on the first CTAT voltage.

28. The apparatus of claim 27, further comprising:

means for applying a fifth voltage across a sixth set of resistors, wherein the fifth voltage is based on a difference between the single-bias voltage and the first CTAT voltage; and means for applying a sixth voltage across a seventh set of one or more resistors, wherein the sixth voltage is based on a difference between the first voltage and a supply rail voltage.

29. The apparatus of claim 28, further comprising means for generating the second voltage substantially the same as the first voltage.

30. The apparatus of claim 21, further comprising means for generating the second voltage substantially the same as the first voltage.

* * * * *